UNITED STATES PATENT OFFICE.

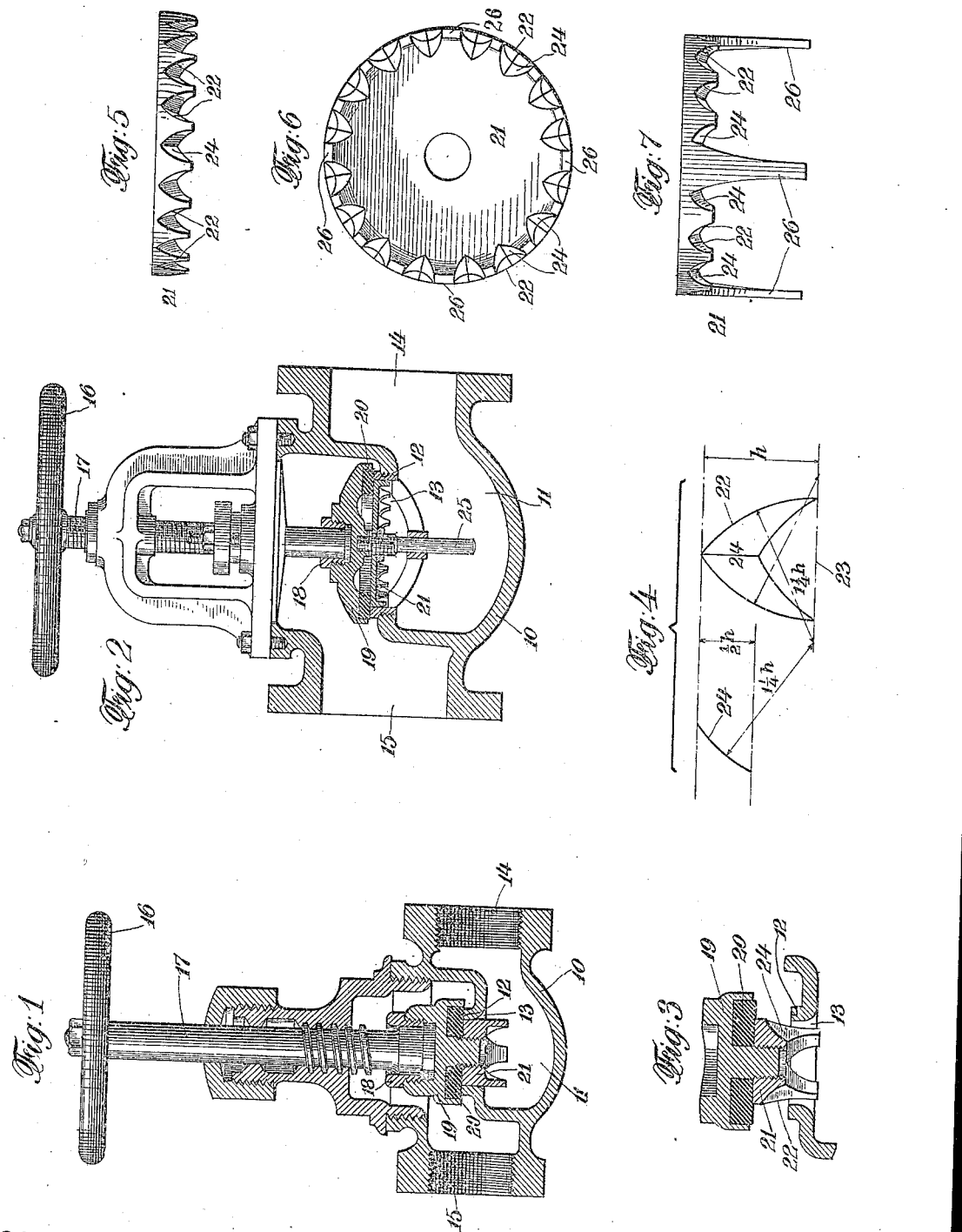

JAMES A. DONNELLY, OF BROOKLYN, NEW YORK.

VALVE.

952,187. Specification of Letters Patent. Patented Mar. 15, 1910.

Application filed June 1, 1909. Serial No. 499,413.

*To all whom it may concern:*

Be it known that I, JAMES A. DONNELLY, a citizen of the United States, and a resident of Brooklyn, in the county of Kings and State of New York, have invented certain new and useful Improvements in Valves, of which the following is a specification.

My invention relates to valves for regulating the flow of fluids, and particularly to valves constructed with so-called "renewable disks." These valves are of two types—stop valves, designed to be either fully opened or fully closed; and throttling valves, designed to be only partly opened, usually not more than one-fourth of the total area of valve opening.

It has for its object to prevent the cutting of the seat or the disk of such valves, due to the wire-drawing effect of the fluid passing therethrough at high velocity at the instant the disk leaves its seat, in the case of stop valves, by having it occur between a renewable throttling piece and some other portion of the valve passage; and in the case of throttling valves, to obtain better control of the flow and to prevent irregular cutting of the orifices of said throttling piece by shaping the orifices of same so as to conform to that which would naturally be produced by the wire-drawing effect; and in either case to so shape the outlet of said throttling piece that the jet of fluid issuing therefrom does not directly strike the soft disk or the seat of such valve. I attain these objects in the valve set forth in the following specification and illustrated in the accompanying drawings, in which—

Figure 1 is a vertical section of a standard form of globe valve fitted with an improved throttling nut. Fig. 2 is a vertical section of a different style of globe valve provided with the improved throttling nut. Figs. 3 and 4 are detail views of the outlet of the throttling nut. Fig. 5 is a detail view of the throttling nut employed in the valve shown in Fig. 2. Figs. 6 and 7 are respectively a plan view and an elevation of a modified form of nut.

Similar characters of reference designate corresponding parts throughout the several views.

Referring now to the drawings—10 designates the valve body providing a casing 11 containing the various parts and affording a valve seat 12 provided with a passageway 13. The casing is provided with an inlet 14 and outlet 15, and the valve is operated by wheel 16 through the spindle 17, suitably packed. Spindle 17 carries a lock nut 18, disk holder 19 and the disk 20, which disk is of special metal or vulcanized rubber compound, and is held in place by my improved throttling nut 21. In all valves of this type, whether automatic or hand operated, the fluid attains a very high velocity between the said disk and seat at the instant the disk 20 leaves its seat 12, the wire-drawing effect operating therefore principally at this point. To shift this point of wear, I arrange the nut 21 to have a reasonably tight piston fit in the passage-way 13 and provide the same with an orifice or orifices 22, so that the wire-drawing effect is displaced to the orifices of the renewable nut 21 and sides of the passage-way 13. The orifice through which the fluid flows is designed to be of a shape as near as possible as that to which the fluid flowing therethrough would eventually wear. I have observed that usually the wire-drawing effect of steam or water upon such orifice is to produce a triangular shaped opening have the two sides rounded and substantially of the form shown (see particularly Figs. 3 and 4). This shape is obtained by striking arcs whose centers are on the base line 23 (Fig. 4) and of a radius equal to substantially one and one-fourth the height of the orifice. This shape provides a maximum surface over which the wear is uniformly distributed, so that the nut will last much longer than the usual throttling nut without showing material wear or change of form. I prefer, also, to provide a passage-way or port 24 to the orifice by gouging inwardly the nut to about one-half the depth of the orifice, the curvature being similar to that of the sides. In opening the valve, the first flow which will thus be very small will be between the throttling nut 21 and sides of the seat, and as the valve disk 20 is further raised the rounded form of the orifice causes the wear to be uniformly distributed and the gouged portion insures that the stream of fluid is not directed so as to directly strike the soft disk 20 or the seat 12. The nut 21 may be provided with a single orifice 22 only, but I prefer to provide a plurality of the same; and, as the valve is further opened, the area of opening is proportionately increased. By making the number of orifices as large as possible a better control of the flow is afforded, and a better distribution of the wear effected. Where no throttling effect is desired, the depth of these orifices may be comparatively shallow. In this event, guides 26 may be provided between groups of the orifices and are carried down sufficiently to prevent a complete withdrawal when the valve is wide open. Or, the said guides, if shorter, may be beveled off at the ends so that the nut 21 may readily enter the valve passage-way 13. When the valve is intended to be used as a stop valve only and not as a throttling valve, the cutting of the disk or seat only occurs when the valve is first opened and consequently the obstructing partitions between the adjacent throttling orifices may be dispensed with beyond an opening corresponding to about one-fourth of the total valve area.

In connection with the use of the throttling nut with valves intended to be used continuously as throttling valves, the total amount of opening very seldom requires to be more than one-fourth or one-half of the total area of the valve opening; and the partitions separating the adjacent orifices need not be carried down so great a distance (see Fig. 5).

When the valves are constructed in larger sizes they are provided with a central rod 25 (Fig. 2) carried down through the disk 20 to guide the said disk or throttling nut 21, so that the guides 26 of the said nut may in this form be dispensed with.

Different fluids as well as various impurities sometimes carried by these fluids such as sand and grit may cause a variation in the contour of the orifice and port. In any event the best effects are obtained by closely imitating the form as produced by the natural wear.

I am aware that the triangular and square orifices have been employed in valves of this character, but all these soon change their form and show wear, particularly in one spot only. The wear starting thus irregularly, the irregularity persists, becoming more and more pronounced until finally the nut must be replaced. It has been found impracticable to employ a great number of orifices unless of the form herein disclosed, because of this irregular wear. There being no uniform distribution of said wear, one orifice receives practically the entire wear while the others remain unaffected.

The throttling nut herein disclosed is applicable to automatically operated pressure reducing valves, or other automatic valve devices, check valves and the already described hand operated throttling or stop valves.

I claim:—

1. In a fluid regulating valve, comprising a valve body providing a casing having an inlet, an outlet and a valve passage way; a valve seat, and a disk to seat thereon; and a throttling piece or nut to fit said passage way, said throttling nut being provided with a triangular orifice or orifices the two sides of which are curved, and the curvature being that which the wire-drawing effect of the fluid would naturally produce.

2. In a fluid regulating valve, comprising a valve body providing a casing having an inlet, an outlet and a valve passage way; a valve seat, and a disk to seat thereon; and a throttling piece or nut to fit said passage way, said throttling nut being provided with a triangular orifice or orifices the two sides of which are curved, and the radius of curvature being equal to one and one-fourth the height of the orifice or orifices.

3. In a fluid regulating disk-valve, comprising a valve body providing a casing having an inlet, an outlet and a valve passage way; a valve seat, and a disk to seat thereon; and a cylindrical throttling piece or nut having a piston fit in said valve passage-way, said throttling nut being provided with a triangular orifice or orifices the two sides of which are curved, and the radius of curvature being equal to one and one-fourth the height of the orifice or orifices.

4. In a fluid regulating disk-valve, comprising a valve body providing a casing having an inlet, an outlet and a valve passageway; a valve seat, and a disk to seat thereon; and a throttling piece or nut to fit said passage-way, said throttling nut being provided with a triangular orifice or orifices, the two sides of which are curved and the curvature being that which the wire-drawing effect of the fluid would naturally produce, and with a port or ports communicating with said orifice or orifices, and of a curvature substantially similar to that of the sides of said orifice or orifices to direct the fluid in such a manner as to prevent it from impinging directly against the said seat and disk.

5. In a fluid regulating disk-valve, comprising a valve body providing a casing having an inlet, an outlet and a valve passageway; a valve seat, and a disk to seat thereon; and a throttling piece or nut to fit said passage-way, said throttling nut being provided with a triangular orifice or orifices, the two sides of which are curved and the radius of curvature being equal to one and one-fourth the height of the orifice or orifices, and a port or ports communicating with said orifice or orifices, and of a curvature substantially similar to that of the sides of said orifice or orifices to direct the fluid in such a manner as to prevent it from impinging directly against the said seat and disk.

6. A cylindrical throttling nut having a plurality of peripheral, triangular orifices, and interior ports communicating therewith, the curvature of sides of said orifices and the curvature of said ports being that which the wire-drawing effect of the fluid would naturally produce.

Signed at New York in the county of New York and State of New York this 29th day of May A. D. 1909.

JAMES A. DONNELLY.

Witnesses:
 FRED'K F. SCHUETZ,
 H. R. INNIS.